United States Patent
Boss et al.

(10) Patent No.: US 11,606,829 B2
(45) Date of Patent: Mar. 14, 2023

(54) FACILITATION OF DATA TRANSMISSION IN LOW CONNECTIVITY AREAS

(71) Applicant: Kyndryl, Inc., New York, NY (US)

(72) Inventors: Gregory J. Boss, Saginaw, MI (US); Jeremy R. Fox, Georgetown, TX (US); Michael Bender, Rye Brook, NY (US); Zachary A. Silverstein, Austin, TX (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/443,900

(22) Filed: Jun. 18, 2019

(65) Prior Publication Data
US 2020/0404727 A1    Dec. 24, 2020

(51) Int. Cl.
| | | |
|---|---|---|
| H04W 76/18 | (2018.01) | |
| H04W 4/70 | (2018.01) | |
| H04W 76/14 | (2018.01) | |
| H04W 76/11 | (2018.01) | |
| H04W 12/033 | (2021.01) | |
| H04W 72/563 | (2023.01) | |
| H04W 84/18 | (2009.01) | |

(52) U.S. Cl.
CPC ............ *H04W 76/18* (2018.02); *H04W 4/70* (2018.02); *H04W 12/033* (2021.01); *H04W 72/563* (2023.01); *H04W 76/11* (2018.02); *H04W 76/14* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 7,542,721 B1 * | 6/2009 | Bonner | ................ | G08B 25/004 340/539.1 |
| 2007/0242601 A1 * | 10/2007 | Gbadegesin | ........ | H04L 12/5692 370/216 |
| 2010/0124196 A1 | 5/2010 | Bonar | | |
| 2011/0243010 A1 * | 10/2011 | Geirhofer | ............. | H04W 52/08 370/252 |
| 2012/0106552 A1 * | 5/2012 | Iwao | ..................... | H04W 40/02 370/392 |
| 2012/0140678 A1 | 6/2012 | Veillette | | |
| 2014/0226566 A1 * | 8/2014 | Soneda | ................. | H04W 40/02 370/328 |
| 2017/0134981 A1 * | 5/2017 | Duschl | ............. | H04W 28/0221 |

(Continued)

FOREIGN PATENT DOCUMENTS

WO    2015183583 A1    12/2015

OTHER PUBLICATIONS

"About Commotion", Commotion Wireless, printed on Mar. 12, 2019, 3 pages, <https://www.commotionwireless.net/about/>.

(Continued)

*Primary Examiner* — Andre Tacdiran
(74) *Attorney, Agent, or Firm* — Erik Swanson, Esq.; Kevin P. Radigan, Esq.; Heslin Rothenberg Farley & Mesiti P.C.

(57) ABSTRACT

In an approach to facilitating data transmission utilizing peer-to-peer communications and wireless ad hoc networks, one or more computer processors detect one or more data transmission failures. The one or more computer processors rank the one or more detected data transmission failures. The one or more computer processors detect one or more subsequent devices. The one or more computer processors determine one or more statuses associated with the detected one or more subsequent devices. The one or more computer processors the one or more detected subsequent devices based on the determined the determined statuses. The one or more computer processors match the one or more ranked (Continued)

data transmission failures with the one or more ranked subsequent devices. The one or more computer processors transmit the one or more data transmission failures with one or more matched subsequent devices.

17 Claims, 4 Drawing Sheets

(56) References Cited

U.S. PATENT DOCUMENTS

| | | | | |
|---|---|---|---|---|
| 2017/0156058 | A1* | 6/2017 | Abdirashid | H04W 12/0013 |
| 2017/0338908 | A1* | 11/2017 | Chebib | H04L 1/1822 |
| 2018/0069696 | A1* | 3/2018 | Yoo | H04L 9/08 |
| 2018/0152824 | A1 | 5/2018 | Baker | |
| 2019/0158789 | A1* | 5/2019 | Snyder | G06F 11/1464 |

OTHER PUBLICATIONS

"MarketsandMarkets (/) Press Releases", printed on Mar. 12, 2019, 10 pages, <https://www.marketsandmarkets.com/press-releases/in-building-wireless.asp>.

Schmelzer, Joe, "The true cost of in-building coverage is in the details", Nextivity on May 24, 2018, IBW Featured Posts, Network Infracture, RCR Wireless News Intelligence on All Things Wireless, 4 pages, <https://www.rcrwireless.com/20180524/network-infrastructure/true-cost-building-coverage-details>.

Simonite, Tom, "Build Your Own Internet with Mobile Mesh Networking", Jul. 9, 2013, 4 pages, <https://www.technologyreview.com/s/516571/build-your-own-internet-with-mobile-mesh-networking>.

Wilson, Mark, "How to use your phone's WiFi connection for several devices", 9 months ago, printed on Mar. 12, 2019, AndroidPIT, <https://www.androidpit.com/share-wifi-over-bluetooth>.

* cited by examiner

FACILITATION OF DATA TRANSMISSION IN LOW CONNECTIVITY AREAS

BACKGROUND

The present invention relates generally to the field of communication networks and more particularly to utilizing peer-to-peer communications and wireless ad hoc networks to facilitate data transmission.

Peer-to-peer (P2P) networking is a distributed application architecture that partitions tasks, workloads, or data between peers. Peers are equally privileged, equipotent participants in the network. Peers make a portion of associated system resources, such as processing power, disk storage, or network bandwidth, directly available to other network participants, without the need for central coordination by servers or participants not directly involved in the transaction. Peers are both suppliers and consumers of resources, in contrast to the traditional client-server model in which the consumption and supply of resources is divided.

A wireless ad hoc network (WANET) is a decentralized type of wireless network. The network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity and the routing algorithm in use. WANETs are self-configuring, dynamic networks in which nodes are free to move. Wireless networks lack the complexities of infrastructure setup and administration, enabling devices to create and join networks "on the fly".

A mobile ad hoc network (MANET) is a continuously self-configuring, infrastructure-less network of mobile devices connected wirelessly. MANETs are a kind of WANET that usually has a routable networking environment on top of a link layer ad hoc network. MANETs consist of a peer-to-peer, self-forming, self-healing network. The devices in a MANET are free to move independently in any direction and will therefore change its links and/or connections to other devices frequently. Said devices must forward traffic unrelated to its own use, and therefore be a router. Such networks may operate by independently or may be connected to the larger network or the Internet. Said networks may contain one or multiple and different transceivers between nodes resulting in a highly dynamic, autonomous topology.

SUMMARY

Embodiments of the present invention disclose a method, a computer program product, and a system for facilitating data transmission utilizing peer-to-peer communications and wireless ad hoc networks. The method includes one or more computer processors detecting one or more data transmission failures. The one or more computer processors rank the one or more detected data transmission failures. The one or more computer processors detect one or more subsequent devices. The one or more computer processors determine one or more statuses associated with the detected one or more subsequent devices. The one or more computer processors the one or more detected subsequent devices based on the determined the determined statuses. The one or more computer processors match the one or more ranked data transmission failures with the one or more ranked subsequent devices. The one or more computer processors transmit the one or more data transmission failures with one or more matched subsequent devices.

DETAILED DESCRIPTION

Frequently, users encounter areas that have little to no internet or network connectivity. For example, users located in some areas may not have local access to a doctor but need to send medical data and information to the doctor. Further, users may not have access to devices capable of connecting to available mobile networks but may have access to basic wireless communication hardware and protocols capable of communicating with other near (e.g., subsequent, within an operational range, etc.) computing devices. For example, in some rural areas, the number of cellular networks is often lower and adequate cellular communication coverage can be harder to find. In addition, users may not have access to computing devices capable of longer cellular ranges or hardware that can reliably communicate at lower signal strengths. Embodiments of the present invention allow for the transmission of data utilizing one or more ranked subsequent devices. For example, by utilizing embodiments of the present invention, one or more users, through a chain of one or more computing devices, can access one or more alternative networks and transmit the required data.

Embodiments of the present invention utilize peer-to-peer communication to connect one or more computing devices to one or more subsequent computing devices hosting wireless access points (WAPs). In an example, a computing device can communicate with multiple WAPs to increase the speed of data transmission (e.g., bandwidth), use different WAPs for each service resource accessed, and/or increase the accessibility to a network and one or more service resources. Embodiments of the present invention utilize the creation one or more chains of peer-to-peer connections (e.g., piggybacking, hops, paths, or links) between multiple computing devices to enable a user to ultimately connect or transmit to a subsequent computing device that has access to a specific network (e.g., destination server, endpoint, etc.). In some embodiments of the present invention, each connection in the peer-to-peer communication chain operates at different speeds; utilizes different communication types/protocols; employs various security methods, etc. In various embodiments of the present invention, connections in a chain of peer-to-peer communications independently access a network for a user of a linked computing device while transferring connection requests through the chain of computing devices. As such, data transmission in low connectivity areas is improved in at least these aspects. Implementation of embodiments of the invention may take a variety of forms, and exemplary implementation details are discussed subsequently with reference to the Figures.

The present invention will now be described in detail with reference to the Figures.

Figure 1:
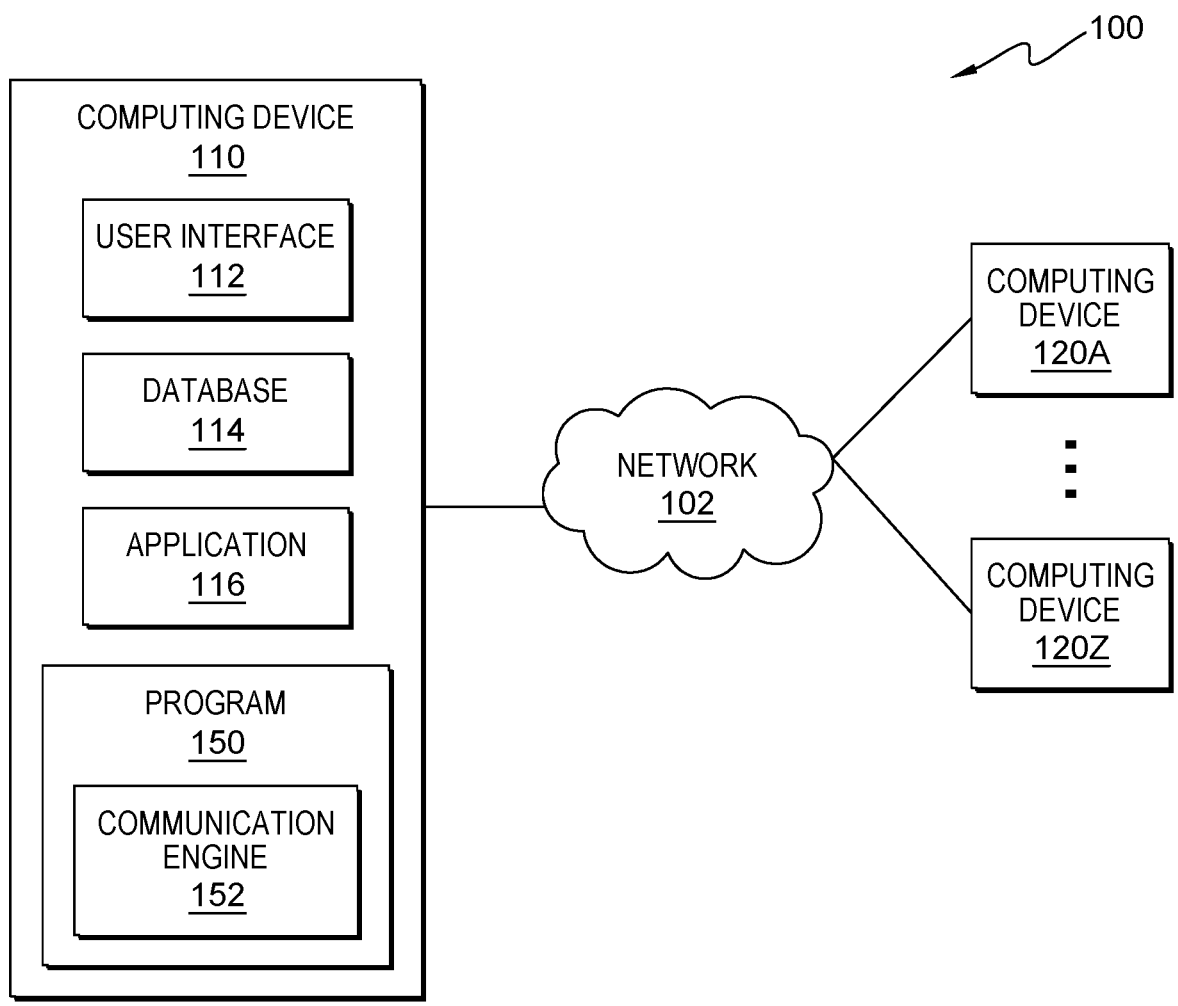
FIG. 1 is a functional block diagram illustrating a networked computing environment, in accordance with an embodiment of the present invention.

FIG. 1 is a functional block diagram illustrating a networked computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Networked computing environment 100 includes computing device 110 and computing devices 120A through 120Z, interconnected over network 102. Network 102 can be, for example, a telecommunications network, a local area network (LAN), a wide area network (WAN), such as the Internet, or any combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, computing devices 120A through 120Z, and other computing devices (not shown) within networked computing environment 100. In various embodiments, network 102 operates locally via wired, wireless, or optical connections and can be any combination of connections and protocols (e.g., personal area network (PAN), near field communication (NFC), laser, infrared, ultrasonic, etc.). In other embodiments, one or more of: computing device 110 and computing devices 120A through 120Z utilize other communication technologies to communicate with another device connected to network 102. In various embodiments, networked computing environment 100 includes a plurality of dynamically established and revoked connections that enable computing device 110, computing devices 120A through 120Z, and/or network 102 to interconnect. Many modifications to the depicted environment may be made by those skilled in the art without departing from the scope of the invention as recited by the claims.

Computing device 110 and computing devices 120A through 120Z each may be a laptop computer, a tablet computer, a netbook computer, a personal computer (PC), a desktop computer, a personal digital assistant (PDA), a smart phone, wearable devices (e.g., digital eyeglasses, smart glasses, smart watches, smart televisions, etc.), or any programmable computer systems known in the art with capabilities of communicating with network 102. In various embodiments, computing device 110 and computing devices 120A through 120Z each may represent a server computing system utilizing multiple computers as a server system, such as in a cloud computing environment. Computing devices 120A through 120Z are representative of a plurality of computing devices (e.g., computing device 110). In one embodiment, computing devices 120A through 120Z may include any combination of computing devices. In other embodiments, computing device 110 and computing devices 120A through 120Z each may contain other applications, databases, programs, etc. which have not been depicted in networked computing environment 100. Computing device 110 and computing devices 120A through 120Z each may include internal and external hardware components, as depicted and described in further detail with respect to FIG. 4. In general, computing device 110 and computing devices 120A through 120Z are representative of any electronic device or combination of electronic devices capable of executing machine readable program instructions as described in greater detail with regard to FIG. 4, in accordance with embodiments of the present invention. In the depicted embodiment, computing device 110 and computing devices 120A through 120Z each contain user interface 112, database 114, and program 150.

User interface 112 is a program that provides an interface between a user of computing device 110, users of computing devices 120A through 120Z, and a plurality of applications that reside on said computing devices (e.g., data transfer program, messaging applications, etc.) and/or may be accessed over network 102. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. In an embodiment, user interface 112 can control sequences of actions that the user utilizes to respond and/or confirms actions associated with program 150, such as confirming data transmission to one or more computing devices.

Database 114 is a repository for data used by program 150. In the depicted embodiment, database 114 resides on computing device 110. In another embodiment, database 114 may reside on computing devices 120A through 120Z or elsewhere within networked computing environment 100 provided program 150 has access to database 114. A database is an organized collection of data. Database 114 can be implemented with any type of storage device capable of storing data and configuration files that can be accessed and utilized by program 150, such as a database server, a hard disk drive, or a flash memory. In an embodiment, database 114 stores user data associated with a plurality of users and one or more computing devices respectively associated with each user. In one embodiment, user data includes information associated with a computing device such as an ID of the computing device, current volunteer status, historical volunteer statuses, device capabilities (e.g., available connections, storage capacity, central/graphical processing capabilities, etc.), connection speeds (e.g., bandwidth, throughput, strength, reliability, etc.), security features (encryption standards (e.g., AES, RSA, etc.), etc.), battery statistics (e.g., power-on durations, battery capacity, battery type, etc.), computing device states (e.g., volunteer status, transmission status, associated signal strengths etc.), location data, installed programs, and available protocols (e.g., file transfer protocol (FTP), etc.), etc. In various embodiments, the aforementioned information is updated on a periodic or on-demand basis.

Application 116 is a set of one of more programs designed to carry out the operations for a specific application to assist a user to perform an activity. Application 116 may include a plurality of applications, such as web browsers, office productivity suites, one or more telecommunication programs, instant messaging (IM) applications, navigation applications, map applications, one or more programs/applications associated with a service provider, banking applications, third-party payment applications, encryption applications, etc. Application 116 may also include various entertainment applications, such as music applications, picture applications, streaming applications, games, etc. In the depicted embodiment, application 116 resides on computing device 110. In another embodiment, application 116 may reside on computing devices 120A through 120Z or on another computing device (not shown) connected over network 102.

Communication engine 152 is a sub program of program 150 that is representative of a plurality of programs, applications, or protocols that enabling connections and/or communications (e.g., wired, wireless, etc.). In an example, communication engine 152 includes support for 3G, 4G, LTE, and other wireless communication technologies, standards, and protocols. In an embodiment, communication engine 152 hosts one or more WAPs. Multiple aspects of communication engine 152 can execute concurrently, such as a computing can both host a WAP and communicate with another computing device via network 102. In one embodiment communication engine 152 enables a computing device, such as computing device 110 and computing devices 120A through 120Z, to wirelessly communicate with network 102. In another embodiment, communication engine 152 enables computing devices, to establish secure or insecure peer-to-peer connections with one or more subsequent computing devices. In various embodiments, communication engine 152 utilizes tunneling protocols, proxies (e.g., transparent), virtual private networks (VPN), virtual private LAN services, and/or secure shells (SSH) to establish one or more wireless peer-to-peer communication routes, connections, or paths.

The present invention may contain various accessible data sources, such as database 114, that may include personal storage devices and content the user wishes not to be used, program 150 allows the user to opt in or opt out of exposing personal information. Program 150 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In some embodiments, program 150 may implement the following steps. Program 150 detects one or more data transmission that have failed to transfer. Program 150 ranks the failed data transmissions utilizing a plurality of rationales, preferences, and rules described in detail in the discussion of FIG. 2. Program 150 utilizes one or more network interfaces to detect subsequent computing devices available receptive to facilitating data transmission. Program 150 ranks the detected subsequent computing devices utilizing a plurality of rationales, preferences, and rules described in detail in the discussion of FIG. 2. Program 150 matches the ranked failed data transmissions with the ranked detected subsequent computing devices. Program 150 transfers one or more failed data transmissions to the respective one or more matched computing devices. Program 150 is depicted and described in further detail with respect to FIG. 2.

In various embodiments, the term "data transmission" should be construed having a broad meaning and include all types and categories of transmission and data. In another embodiment, the term "data transmission" may be construed to include a single set of related data packets, or a multitude of differing data packets. In an example data transmission, all the associated data packets may be intended for one destination, while in another example data transmission, each packet may have differing destinations. In other embodiments, the term "data transmission" may be construed to include any transmission of data or any request for data. For example, if the user wishes to stream or download a movie, the request to have streaming information returned to the user is construed as a "data transmission".

Figure 2:
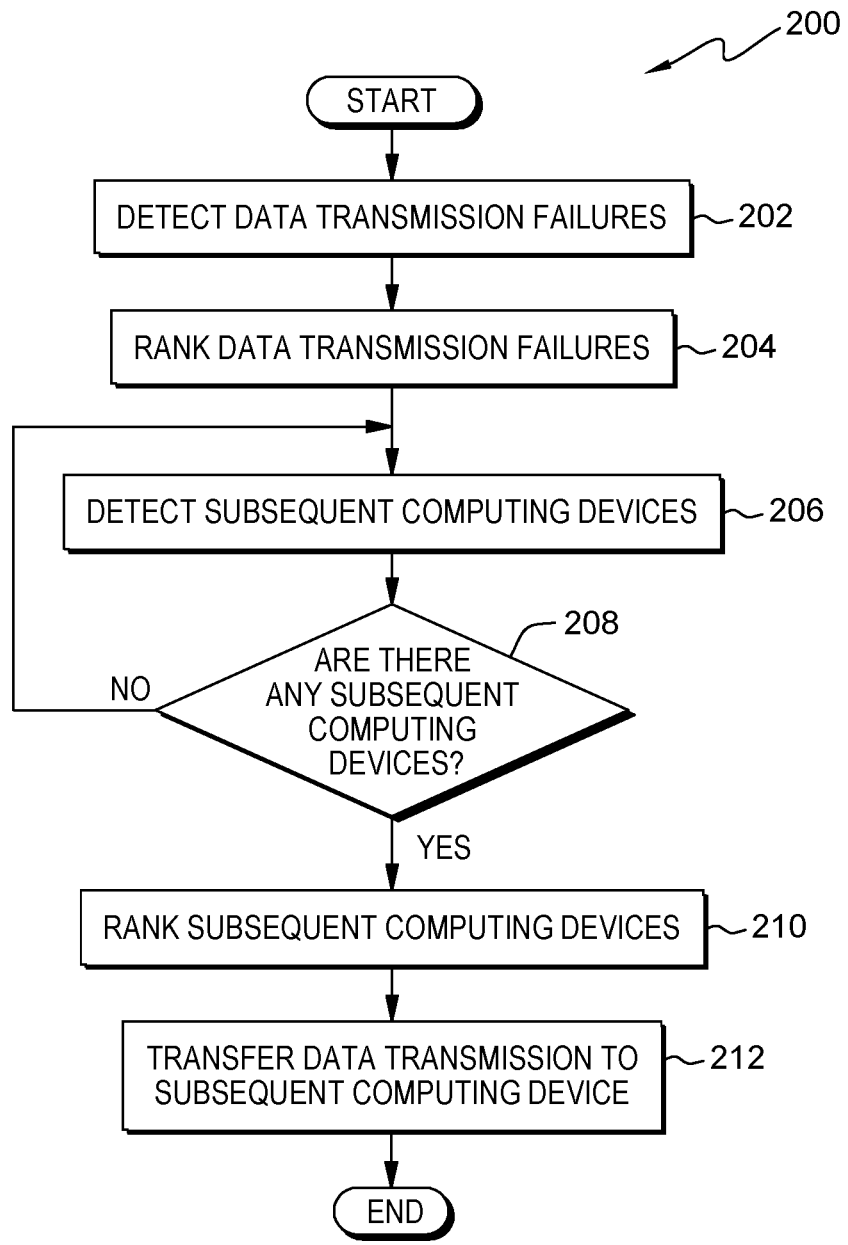
FIG. 2 is a flowchart depicting operational steps of a program, on a computing device within the networked computing environment of FIG. 1, facilitating data transmission utilizing peer-to-peer communications and wireless ad hoc networks, in accordance with an embodiment of the present invention.

FIG. 2 is a flowchart depicting operational steps of program 150 for facilitating data transmission utilizing peer-to-peer communications and wireless ad hoc networks, in accordance with an embodiment of the present invention.

Program 150 detects data transmission failures (step 202). Program 150 detects, identifies, and determines the technical and performance parameters, details, statistics of one or more network interfaces and associated networks available to a computing device (e.g., computing device 110, etc.). In an embodiment, program 150 utilizes the operating system of a computing device, associated with the user, to identify all available network interfaces. In this embodiment, program 150 triggers an operating system call to return all available network interfaces. In another embodiment, program 150 iterates through every hardware unit on a device, conducting network interface tests to identify said unit as a network interface. Responsive to identifying a network interface, a network interface profile is created and stored within database 114. In various embodiments, program 150 generates a UUID and associates the created profile with said UUID. In an additional embodiment, program 150 generates a GUID and associates the created profile with said GUID. The GUID allows for a plurality of network interface profiles to be group into related sets such as computing device sets, geographical sets, and network sets. In various embodiments, program 150 retrieves and stores associated manufacturer technical specifications and information.

In various embodiments, program 150 runs a plurality of intermittent network tests to determine baseline performance parameters and statistics of the identified network interfaces such as average error rates, latency rates, transmission overhead, upload rate, download rate, and general network/internet connectivity. In an embodiment, program 150 utilizes error rate tests to measure, determine, and store the number of transferred bits that have been altered due to noise, interferences, distortion, or bit synchronization errors. In this embodiment, program 150 utilizes parity checking, cyclic redundancy checking, and generic checksums to identify errors and failures in data transmission. For example, program 150 utilizes parity checking to identify bits that may have been altered in transmission which may indicate a substantial amount of signal noise or downstream inaccuracies. Program 150 may store said error results in bit error rate (BER) or as a bit error probability. In an additional embodiment, program 150 monitors and records the power consumption statistics of the network interface and generalized battery statistics. In various embodiments, program 150 incorporates pricing information specific to a network such as cost per transaction, cost per unit of data, cost per unit of data dependent on existing condition (e.g., cost during peak and non-peak hours, etc.). The aforementioned tests are stored within respective network interface profiles stored within database 114.

Program 150 runs multiple variations of the above detailed network tests differentiated by alterations to intermediate servers, nodes, and the endpoint/destination. For example, program 150 initiates a set of localized network tests with the endpoint designated as a local server or network node. In a further example, program 150 initiates another set of network tests designating the first server or node of the network as the endpoint. In an additional example, program 150 initiates a set of network tests designating a full end-to-end test, tracing the entire route between a computing device and a subsequent computing device (e.g., node, target server, etc.). In an embodiment, program 150 will continuously test and monitor an identified network interface. In another embodiment, program 150 schedules network tests to be run at predefined or determined intervals. For example, program 150 schedules network tests to be initiated every hour or every day. Program 150 utilizes the aforementioned tests to identify and predict data transmission failures. For example, if program 150 determines that the computing device does not have sufficient network connectivity to complete a data transmission, then program 150 will determine and/or categorize said data transmission as a failure (e.g., failed data transmission). In another embodiment, program 150 continuously pings for internet access and determines that all data transmissions have failed if the ping does not receive a reply, the data loss is over a predetermined loss threshold (e.g., <75%), or if the ping response time is over a predetermined response threshold (e.g., >350 ms).

Responsive to identifying and testing one or more network interfaces, program 150 concurrently monitors the operating system, application, and/or network interface of a computing device for the initiation and detection of a data transmission or network connection/access request. In various embodiments, program 150 acts as an inline proxy and/or a transparent proxy 'sitting' in between the computing device and subsequent computing device, node, destination network, and/or server. In this embodiment, all network traffic to and from the computing device will transmit (e.g., travel) through program 150. In another embodiment, program 150 monitors application activity to determine a data and/or network transmission and/or request. Responsive to program 150 detecting an attempted data transmission, program 150 continues to monitor the data transmission and associated network interfaces for the completion or failure of a data transmission.

Program 150 ranks data transmission failures (step 204). Responsive to detecting one or more data transmission failures, program 150 identifies, categorizes, and ranks said data transmission failures. In an embodiment, program 150 identifies the content contained in the failed data transmission and categories said content. In this embodiment, program 150 may utilize generic data categories to determine the requisite security, protocol, and performance standards of the transmission. In another embodiment, program 150 utilizes historical data transmissions, contained within database 114, to identify and categorize one or more failed data transmissions. In this embodiment, program 150 is able to match or generalize failed data transmissions utilizing historical completed or failed data transmissions and extrapolating historical requirements to current failures.

Program 150 may request and receive information from the application attempting to transmit the data. In this embodiment, the received information may include the intended destination (e.g., IP addresses, domain names, targeted servers, or networks), minimum/suggested security standards, performance requirements, and required protocols. For example, a user may utilize a medical oriented application to send confidential information to a medical professional. In this example, said application may transmit details regarding required elevated security measures (e.g., data encryption, recipient identification, etc.) to protect the privacy of the user. In an embodiment, program 150 identifies the destination of the failed data transmission. Responsive to identifying the destination or target server/device, program 150 determines the (e.g., minimum) protocols, standards, and measures required to adequately and securely transfer said data. For example, if the failed data transmission is intended for a domain associated with a financial institution, then program 150 sets elevated security and protocols requirements, such as forced encryption and secure transport mechanisms.

Program 150 may determine temporal constraints associated with a failed data transmission. In an embodiment, program 150 receives temporal (e.g., time) limitations from the utilized application. In another embodiment, program 150 utilizes historical transmissions to determine and associate temporal constraints. For example, if a data transmission historically requires specific response time or delivery time, then program 150 may render the transmission invalid if not transmitted or received within said duration. In various embodiments, temporal constraints are applied from user preferences. For example, a user may specify that if a data transmission is not received within ten hours then the contained, encrypted, data should be discarded. In an embodiment, temporal constraint parameters and user preferences are associated with the data transmission and transmitted therein.

Program 150 utilizes the determined security, performance, protocols, and temporal constraints to rank the one or more failed data transmissions. In an embodiment, program 150 assigns weights to each failed data transmission based on historical transmission and user preferences. For example, program 150 calculates the weight as a measure of the prominence (e.g., importance) of a failed data transmission. In an embodiment, program 150 may assign individual weights to each requirement (e.g., security, performance, protocols, temporal constraints), based on application settings, computing device preferences, or user preferences, and generate a composite score (e.g., numerical representation). For example, program 150 may generate composite scores calculated on a scale of 0 to 100 where greater values (e.g., 80) represent a greater importance and lower numbers (e.g., 20) would indicate a lesser importance. In some embodiments, program 150 assigns a weight for each failed data transmission based on a plurality of factors including, but not limited to: user location, historical likelihood of transmission success, quantity of data contained within the transmission, and one or more categorizations of the data contained within the data transmission. In various embodiments, program 150 utilizes the weights to rank the failed data transmissions. The ranking functions as a priority score for failed data transmissions allowing program 150 to determine the most critical data. In some embodiments, the ranking serves as a probability score for a failed data transmission representing the probability of a future successful data transmission.

Program 150 detects subsequent devices (step 206). Program 150 utilizes the identified, tested, and monitored network interfaces, as detailed in step 202, to detect and identify one or more subsequent, network enabled, computing devices. In one embodiment, program 150 identifies one or more subsequent computing devices that are available to process one or more data transmissions (e.g., peer-to-peer requests) based on "listening" for signals from subsequent computing devices broadcasting (e.g., beaconing, advertising, etc.) the capability to provide an access point to access a downstream network or the ability to store, transport, and/or "piggyback" the data transmission to one or more subsequent computing devices. In another embodiment, program 150 utilizes an instance of communication engine 152 to broadcast a request for a peer-to-peer connection. In this embodiment, program 150 awaits a response from one or more computing devices in a predetermined proximity (e.g., signal strength threshold, distance threshold, etc.). In various embodiments, program 150 identifies or receives additional information associated with a computing device, such as identifying information (e.g., UUID, MAC address, user information, etc.), device volunteer status, device historical information, available hardware, available bandwidth, available protocols (e.g., encryption, wireless, communication, etc.), a duration of time that the computing device will receive incoming connections, and security protocols/measures. In an embodiment, program 150 utilizes historical interactions with said computing devices or similar computing devices to determine the status and capabilities of detected and identified computing devices.

In some embodiments, program 150 identifies other information associated with a computing device, such a location of said computing device hosting a WAP, states of one or more features of the computing device, etc. The location of a computing device may be determined by information obtained from network 102, provided by an installed application, or derived from location determining hardware (e.g., global positioning unit, etc.). In various embodiments, program 150 utilizes multiple subsequent computing devices to establish a chain of peer-to-peer communications without an active connection to a network or a service provider.

If program 150 determines that there are no computing devices (no branch, decision step 208), then program 150 returns to detecting subsequent devices (step 206).

If program 150 determines that there are devices (yes branch, decision step 208), then program 150 ranks the subsequent computing devices (step 210). In an embodiment, program 150 receives one or more capabilities of one or more detected computing devices, as detailed in step 206, and assigns one or more weights to the received capabilities. In this embodiment, weights are calculated utilizing user preferences and/or historical connections and transmissions. In an additional embodiment, program 150 receives preferences and constraints associated with the subsequent computing device, such as acceptable system resource utilization (e.g., bandwidth, storage, memory, central processing usage, etc.), preferred/allowed transfer times, current and historical volunteer status (e.g., accepting new connections, accepting specific connections (e.g., constrained to temporal limitation, type of data, domain restrictions, geographical restrictions, etc.), and mobile service provider information (e.g., subscription details, subscription restrictions, etc.). In an embodiment, program 150 may assign individual weights to each the aforementioned capabilities, preferences, and constraints and generate a composite score (e.g., numerical representation) calculated from all the weights. For example, program 150 may generate composite scores calculated on a scale of 0 to 100 where greater values (e.g., 80) represent a con and lower numbers (e.g., 20) would indicate a lesser importance. In various embodiments, program 150 may determine that if a subsequent computing device does not have one or more capabilities (e.g., absolute requirements), then said computing device is not considered a viable option and thus eliminated from the selection pool of computing device or weighted/ranked in a manner that effectively prevents the computing device from being selected. For example, a subsequent device may not have a required encryption protocol necessitated by either the user of the originating or transferring computing device, an application, or the data transmission. In this example, program 150 removes said subsequent computing device from the selection pool.

Program 150 can consider one or more states associated with a subsequent computing device, such as remaining battery, available bandwidth, and/or volunteer status when weighting or ranking the subsequent device or weighting one or more capabilities contained therein. In an embodiment, program 150 determines whether the subsequent device has sufficient battery in order to complete a data transmission and respond with a confirmation notification. In this embodiment, program 150 utilizes the calculated speeds of one or more network interfaces along with the size and type of data contained in the data transmission and subsequent computing device information received from the subsequent device to determine whether said subsequent computing device has sufficient power to complete the data transmission. In another embodiment, program 150 receives and considers the quantity and quality of subsequent computing devices that the subsequent computing has detected and identified.

Program 150 may rank one or more subsequent computing devices based on a plurality of factors required by the originating computing device (e.g., computing device 110) or subsequent computing device such as bandwidth, security, a duration of time available for hosting peer-to-peer communications, and/or peer-to-peer connection reliability (e.g., signal strength). In an embodiment program 150 utilizes the aforementioned composite score to rank the subsequent devices. In embodiment, higher ranked devices are deemed more suitable/appropriate (e.g., conform to the largest number of requirements or standards) than lower ranked computing devices. In various embodiments, program 150 utilizes a predetermined rank or score threshold, based on user, application, or device preferences, eliminating any subsequent devices having a composite score or rank less than or below said threshold.

Program 150 transfers data to one or more subsequent devices (step 212). Program 150 matches one or more ranked data transmission failures with the one or more ranked subsequent computing devices. In an embodiment, program 150 utilizes one or more matching algorithms to pair the failed data transmissions with the most appropriate (e.g., highest ranked, compatible networks protocols, necessary security measures, etc.) subsequent computing device. In an embodiment, program 150 utilizes a Gale-Shapley based algorithm to map (e.g., match) a set of elements containing failed data transmissions to another set of elements containing detected subsequent computing devices. In this embodiment, one or more failed data transmissions can be matched to one or more subsequent computing devices. In another embodiment, program 150 creates a bipartite graph where one or more elements contained in the set of failed data transmissions are paired with one or more elements contained in the set of detected subsequent computing devices. In yet another embodiment, program 150 creates an adjacency matrix containing the aforementioned sets. In various embodiments, program 150 utilizes a round robin approach to match failed data transmissions with similarly situated (e.g., substantially similar rankings) subsequent computing devices. For example, once a data transmission failure is matched/paired with the highest ranked subsequent computing device, the next data transmission failure is matched/paired with the next remaining highest ranked subsequent computing device, and so forth.

Program 150 may also select one or more ranked computing devices as standby or backup computing devices to ensure reliable transfer of data. In a further embodiment, program 150 utilizes multiple computing devices to improve the response time (e.g., increase the bandwidth), such as accessing a webpage by distributing aspects of the webpage among multiple computing devices. In an example, program 150 utilizes multiple computing devices to transfer several encrypted digital contracts to a destination server in an adjacent country. Program 150 may utilize user interface 112 to allow a user of to select one or more subsequent computing devices. In this embodiment, program 150 may generate a list of subsequent computing devices along with associated capability information. In another embodiment, the list of subsequent computing devices is depicted on a map, illustrating the location of the computing devices in relation to the user and computing device 110.

In response to selecting one or more subsequent computing devices, program 150 utilizes one or more aspects of communication engine 152 to establish one or more secure peer-to-peer connections with the selected one or more computing devices. In response to establishing a peer-to-peer connection and/or path, program 150 transmits or receives one or more data transmissions. In an embodiment, a failed data transmission can be transmitted to a chain of computing devices. For example, a computing device transmits a data transmission to a subsequent computing device which in turn may transmit said data transmission to another subsequent computing device until the data transmission reaches the destination server or device. Program 150 may determine to route the transferred data transmission to multiple subsequent computing devices. In an embodiment, program 150 identifies multiple subsequent computing devices hosting WAPs within communication range of the computing device. Subsequently, program 150 routes portions of the data transmissions to two or more subsequent computing devices. In an example, computing device 110 transmits a request to initiate a peer-to-peer connection and transfer a data transmission that exceeds the bandwidth of computing device 120A and computing device 120B separately. Program 150 can interface with instances of program 150 on computing device 120A and 120B to distribute the processing (e.g., bandwidth, storage) of the data transmission by computing device 110. In various embodiments, program 150 splits one or more payloads (e.g., failed data transmissions (e.g., sets of associated packets or data streams)) and transmits the payloads through one or more network interfaces and associated networks (e.g., WAPs). In this embodiment, the data (e.g., packets) is separated, transmitted, and then reassembled at an intermediate/destination device (e.g., subsequent computing device, server, computer, etc.) allowing a device or application to utilize one or more network interfaces and associated networks.

Program 150 may determine that a corresponding a subsequent computing device (e.g., first subsequent computing device) cannot directly access or communicate with the destination or target server associated with a data transmission failure. In an embodiment, an instance of program 150, on first subsequent computing device, can interface and communicate with the instance of program 150 on the transmitting computing device (e.g., computing device 110, originating computing device, etc.). In this embodiment, the first subsequent computing device instance of program 150 identifies a second subsequent computing device, also containing an instance of program 150. If the second subsequent computing device instance of program 150 can access a subsequent network and/or computing device, then the first subsequent computing device instance of program 150 forwards the data transmission to the second subsequent computing device. In an example, program 150 of computing device 120A receives a request from computing device 110 to transmit a data transmission to a specified domain, however, computing device 120A cannot directly access or communicate with the specified domain/destination. Similarly, if the second subsequent computing device cannot communicate or successfully transfer the data transmission then the second subsequent computing device can find a third subsequent computing device, thus forming a chain of computing devices to transfer the data transmission to the intended destination.

In an embodiment, a notification is sent to the user of computing device 110, with a status (e.g., failed, successful, pending, etc.) of the data transmission. In a further embodiment, program 150 can attach associated information such as transmission duration, number of hops (e.g., number of computing devices utilized), utilized network interfaces, and associated network information. Further notification examples of may include notifications indicating: the subsequent computing device hosting the WAP is terminating a peer-to-peer connection; remaining duration of time that the computing device will allow access; the computing device is approaching a limit for a system resource, such as remaining battery duration or remaining storage space; information describing the locations for one or more new computing devices and associated WAPs, etc. In another embodiment, program 150 transmits one or more notifications associated with a change or alteration that affects a data transmission, such as a data corruption or subsequent data transmission failures. In various embodiments, one or more notifications are transferred via peer-to-peer communications. In other scenarios, program 150 transmits a notification to one or more subsequent computing devices hosting WAPs. In another embodiment, program 150 transmits a notification to a set of subsequent computing devices forming a chain of peer-to-peer connections.

Figure 3:
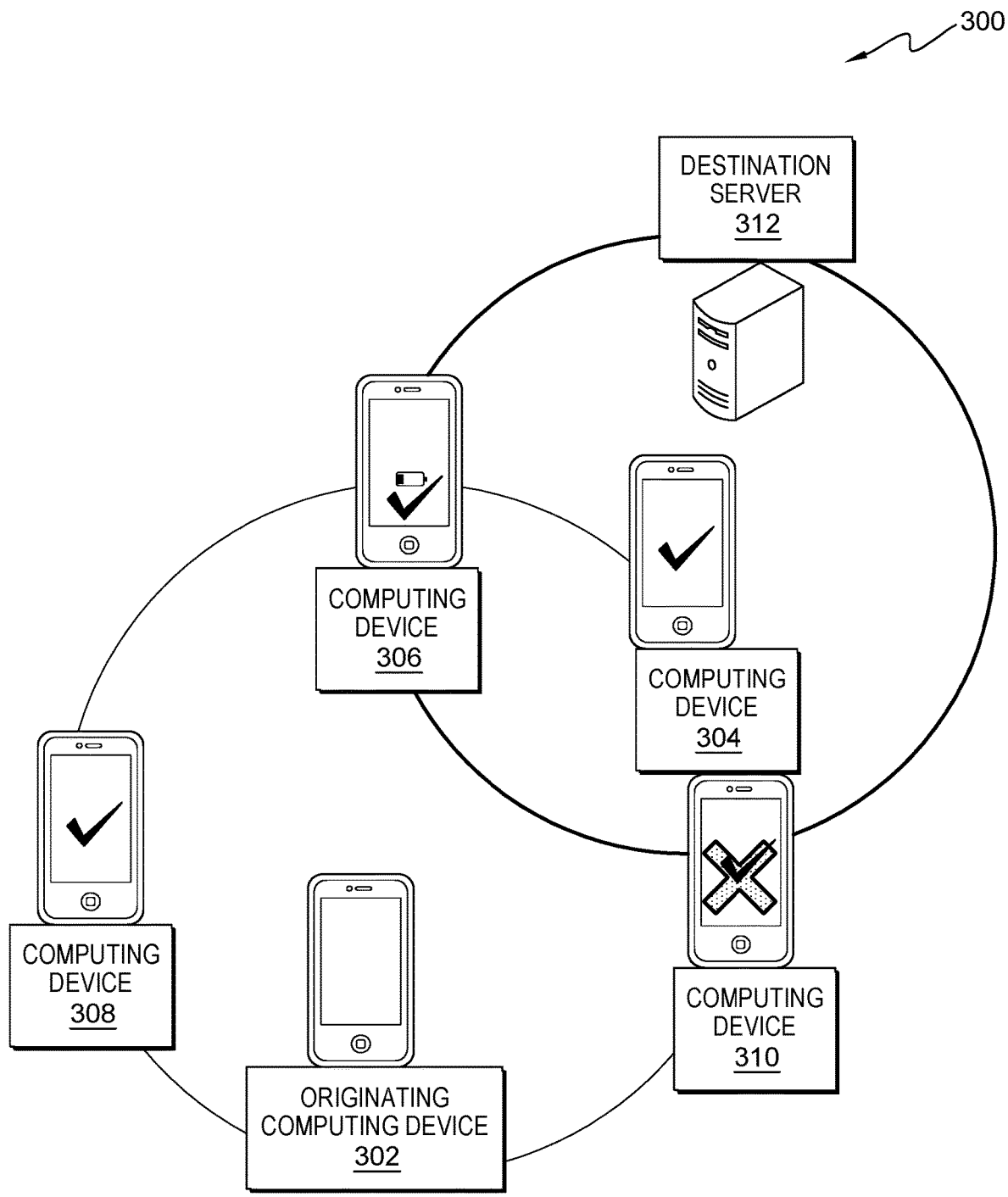
FIG. 3 depicts example 300, containing example embodiments of the present invention, in accordance with an embodiment of the present invention.

FIG. 3 depicts example 300, containing example embodiments of the present invention. Example 300 includes originating computing device 302, a computing device with one or more data transmission failures, computing devices 304, 306, 308, 310, representative of computing devices within a proximity of originating computing device 302, and destination server 312, the intended destination of one or more data transmission failures contained within originating computing device 302.

In a detailed example of flowchart 200, Marcela is working in an area with low mobile internet connectivity due to limited availability of mobile service providers and environmental constraints (e.g., mountains, tall buildings, etc.). As Marcela continues to work utilizing originating computing device 302, Marcela attempts to transmit several confidential, financial records to an office server, destination server 312, located several miles away. Due to low connectivity of the area, the data transmissions fail (the attempted transmission of the financial records). Program 150, contained with originating computing device 302, monitors the network interface associated with originating computing device 302 and detects the data transmissions failures. Responsive to detecting the data transmission failures, program 150 ranks the failed data transmissions based on temporal constraints, importance of the data contained therein, availability of subsequent devices or networks, and the intended destinations.

Responsively, program 150 starts to scan for external WAPs associated with subsequent computing devices in the area (e.g., operational range) of Marcela and originating computing device 302. Program 150 detects and identifies computing devices 304, 306, 308, and 310 as potential volunteers or candidates to facilitate in transmitting said financial to destination server 312. Once identified, program 150 pings and requests additional information regarding the capabilities, status, user/device preferences of the detected subsequent devices. Utilizing the additional information, program 150 ranks the subsequent computing devices based on volunteer status, battery status, available bandwidth, transmission duration, etc. Program 150 ranks the subsequent computing as follows, computing device 304, 306, 308, and 310. Computing device 310 does not have the required storage space to complete the transmission, thus effectively eliminated as an option. Computing device 306 is determined to have a low battery status, thus completion of the data transmission is determined to be tenuous. Program 150 initiates a peer-to-peer connection with computing device 304 and transfers information (e.g., encryption information, destination information, user preferences, etc.) regarding the impeding data transmission. Program 150 then transfers the financial records and, subject to user and data preferences, stores the financial records in an encrypted, isolated section/region of the storage area contained within computing device 304. Computing device 304 transmits the data transmissions to destination server 312 utilizing a mobile network or other associated networks or subsequent computing devices. Computing device 304 transmits a confirmation notification, along with other requested information, back to originating computing device 302, detailing the status (e.g., success or failures, duration of transmission, number of computing devices utilized, etc.) of the data transmission.

Figure 4:
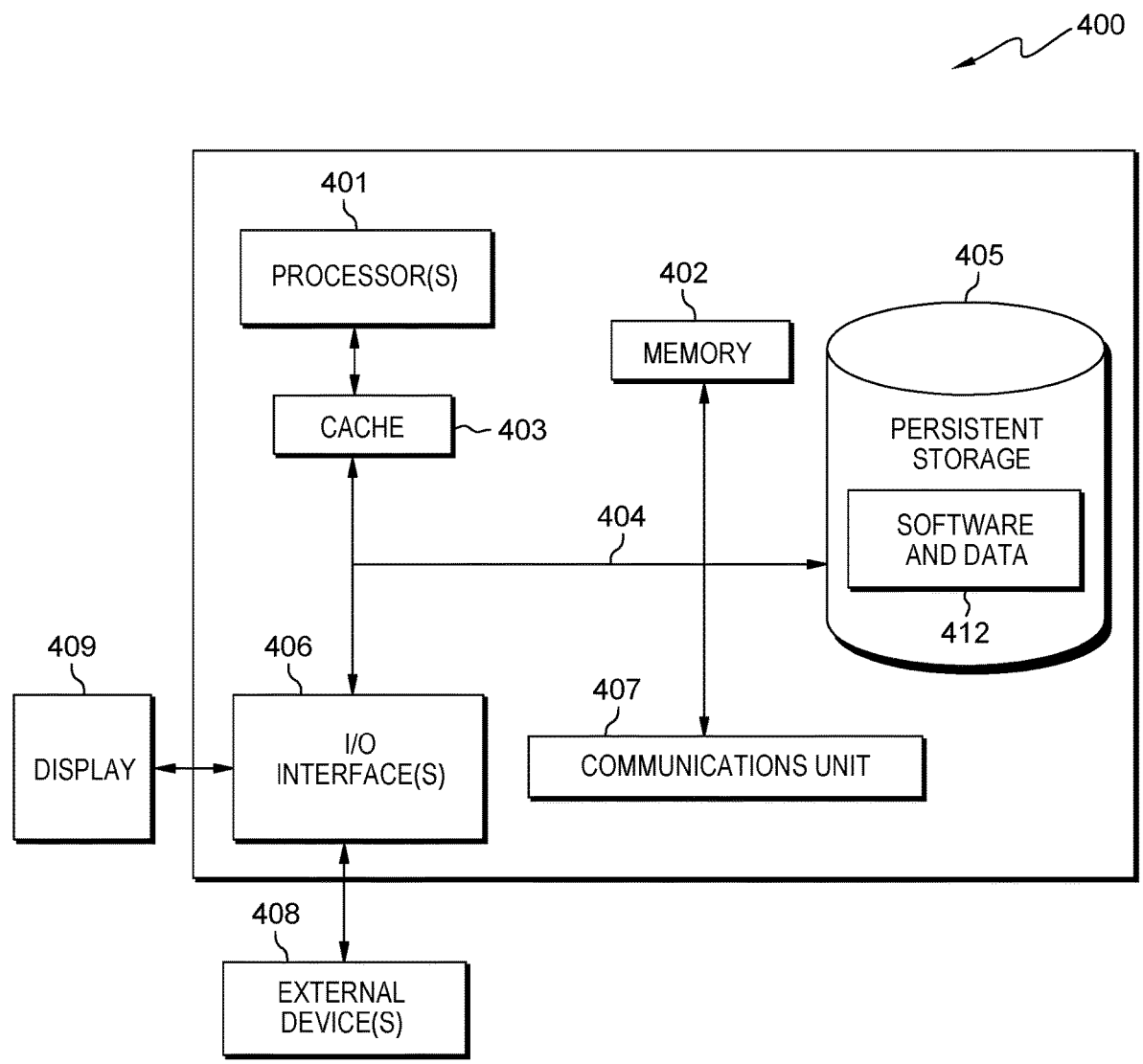
FIG. 4 is a block diagram of components of the computing device executing the program, in accordance with an embodiment of the present invention.

FIG. 4 depicts a block diagram of components of computing device 110 and computing devices 120A through 120Z in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and computing devices 120A through 120Z each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    detecting, by one or more computer processors, multiple failed data transmissions associated with an originating device,
    wherein each failed data transmission contains data packets intended for one or more destination servers;
    ranking, by the one or more computer processors, the multiple detected failed data transmissions to obtain multiple ranked failed data transmissions;
    detecting, by the one or more computer processors, at least two devices,
    wherein each of the at least two detected devices provides transmission to a downstream network or failed data transmission storage;
    determining, by the one or more computer processors, a status for each detected device;
    ranking, by the one or more computer processors, the at least two detected devices based on the determined statuses to obtain at least two ranked devices;
    matching, by the one or more computer processors, one or more ranked failed data transmissions of the multiple ranked failed data transmissions with one or more ranked devices to obtain one or more matched devices,
    wherein the matching is based on the respective ranks of the one or more ranked failed data transmissions and the one or more ranked devices,
    wherein the one or more ranked devices are selected from the at least two ranked devices; and
    transmitting, by the one or more computer processors, the one or more failed data transmissions to a matched device of the one or more matched devices.

2. The method of claim 1,
    wherein ranking the multiple failed data transmissions, further comprises:
    identifying, by the one or more computer processors, a destination of the data contained within each failed data transmission of the multiple failed data transmissions;
    calculating, by the one or more computer processors, weights associated with the multiple failed data transmissions based on a plurality of factors selected from the group consisting of:
        identified data destination,
        device location,
        historical likelihood of transmission success,
        quantity of data contained within the failed data transmission, and
        categorizations of the data packets contained within the failed data transmission;
    generating, by the one or more computer processors, a composite score for each failed data transmission based on the calculated weights; and
    ranking, by the one or more computer processors, the multiple failed data transmissions based on the generated composite scores.

3. The method of claim 1,
    wherein one or more statuses of the statuses associated with the at least two detected devices are selected from the group consisting of:
    identification information,
    volunteer status,
    device and user historical information,
    available bandwidth,
    transfer protocols, and
    security protocols.

4. The method of claim 1,
    wherein transmitting the data packets associated with the one or more failed data transmissions to the matched device of the one or more matched devices, further comprises:
    establishing, by the one or more computer processors, one or more peer-to-peer connections with the matched device of the one or more matched devices; and
    transmitting, by the one or more computer processors, the data packets contained within the one or more failed data transmissions to the matched device of the one or more matched devices utilizing the one or more established peer-to-peer connections.

5. The method of claim 4,
    wherein the transmitted data packets are to be stored in encrypted and isolated regions of the one or more matched devices.

6. The method of claim 1,
    wherein the matching comprises matching the one or more ranked failed data transmissions with multiple ranked devices of the at least two ranked devices to obtain multiple matched devices, the one or more matched devices being one or more matched devices of the multiple matched devices, and
    wherein the method further comprises:
    detecting, by the one or more computer processors, one or more further failed data transmissions associated with the matched device; and
    transmitting, by the one or more computer processors, data packets associated with the one or more further failed data transmissions to a matched device of the multiple matched devices with a next highest rank of the at least two ranked devices.

7. A computer program product comprising:
    one or more computer readable storage media and program instructions stored on the one or more computer readable storage media, the stored program instructions comprising:
    program instructions to detect multiple failed data transmissions associated with an originating device,
    wherein each failed data transmission contains a set of data packets intended for one or more destination servers;
    program instructions to rank the detected multiple failed data transmissions to obtain multiple ranked failed data transmissions;
    program instructions to detect at least two devices,
    wherein each of the at least two detected devices provides transmission to a downstream network or failed data transmission storage;
    program instructions to determine a status for each detected device;
    program instructions to rank the at least two detected devices based on the determined statuses to obtain at least two ranked devices;
    program instructions to match one or more ranked failed data transmissions of the multiple ranked failed data transmissions with one or more ranked devices to obtain one or more matched devices,
    wherein the match is based on the respective ranks of the one or more ranked failed data transmissions and the one or more ranked devices,
    wherein the one or more ranked devices are selected from the at least two ranked devices; and
    program instructions to transmit the one or more failed data transmissions to a matched device of the one or more matched devices.

8. The computer program product of claim 7,
wherein ranking the multiple failed data transmissions, further comprises:
program instructions to identify a destination of the data contained within each failed data transmission of the multiple failed data transmissions;
program instructions to calculate weights associated with the multiple failed data transmissions based on a plurality of factors selected from the group consisting of:
identified data destination,
device location,
historical likelihood of transmission success,
quantity of data contained within the failed data transmission, and
categorizations of the data packets contained within the failed data transmission;
program instructions to generate a composite score for each failed data transmission based on the calculated weights; and
program instructions to rank the multiple failed data transmissions based on the generated composite scores.

9. The computer program product of claim 7,
wherein one or more statuses of the statuses associated with the at least two detected devices are selected from the group consisting of:
identification information,
volunteer status,
device and user historical information,
available bandwidth,
transfer protocols, and
security protocols.

10. The computer program product of claim 7,
wherein transmitting the data packets associated with one or more failed data transmissions to the matched device of the one or more matched devices, further comprises:
program instructions to establish one or more peer-to-peer connections with the matched device of the one or more matched devices; and
program instructions to transmit the data packets contained within the one or more failed data transmissions to the matched device of the one or more matched devices utilizing the one or more established peer-to-peer connections.

11. The computer program product of claim 10,
wherein the transmitted data packets are to be stored in encrypted and isolated regions of the one or more matched devices.

12. The computer program product of claim 7,
wherein the matching comprises matching the one or more ranked failed data transmissions with multiple ranked devices of the at least two ranked devices to obtain multiple matched devices, the one or more matched devices being one or more matched devices of the multiple matched devices, and
wherein the method further comprises:
program instructions to detect one or more further failed data transmissions associated with the matched device; and
program instructions to transmit data packets associated with the one or more further failed data transmissions to a matched device of the multiple matched devices with a next highest rank of the at least two ranked devices.

13. A computer system comprising:
one or more computer processors; one or more computer readable storage media; and program instructions stored on the computer readable storage media for execution by at least one of the one or more processors, the stored program instructions comprising:
program instructions to detect multiple failed data transmissions associated with an originating device,
wherein each failed data transmission contains a set of data packets intended for one or more destination servers;
program instructions to rank the detected multiple failed data transmissions to obtain multiple ranked failed data transmissions;
program instructions to detect at least two devices,
wherein each of the at least two detected devices provides transmission to a downstream network or failed data transmission storage;
program instructions to determine a status for each detected device;
program instructions to rank the at least two detected devices based on the determined statuses to obtain at least two ranked devices;
program instructions to match one or more ranked failed data transmissions of the multiple ranked failed data transmissions with one or more ranked devices to obtain one or more matched devices,
wherein the match is based on the respective ranks of the one or more ranked failed data transmissions and the one or more ranked devices,
wherein the one or more ranked devices are selected from the at least two ranked devices; and
program instructions to transmit the one or more failed data transmissions to a matched device of the one or more matched devices.

14. The computer system of claim 13,
wherein ranking the multiple failed data transmissions, further comprises: program instructions to identify a destination of the data contained within each failed data transmission of the multiple failed data transmissions;
program instructions to calculate weights associated with the multiple failed data transmissions based on a plurality of factors selected from the group consisting of: identified data destination, device location, historical likelihood of transmission success, quantity of data contained within the failed data transmission, and categorizations of the data packets contained within the failed data transmission;
program instructions to generate a composite score for each failed data transmission based on the calculated weights; and
program instructions to rank the multiple failed data transmissions based on the generated composite scores.

15. The computer system of claim 13,
wherein one or more statuses of the statuses associated with the at least two detected devices are selected from the group consisting of:
identification information,
volunteer status,
device and user historical information,
available bandwidth,
transfer protocols, and
security protocols.

16. The computer system of claim 13,
wherein transmitting the data packets associated with one or more failed data transmissions to the matched device of the one or more matched devices, further comprises:
program instructions to establish one or more peer-to-peer connections with the matched device of the one or more matched devices; and program instructions to transmit the data packets contained within the one or more failed data transmissions to the matched device of the one or more matched devices utilizing the one or more established peer-to-peer connections.

17. The computer program product of claim 16, wherein the transmitted data packets are to be stored in encrypted and isolated regions of the one or more matched devices.

\* \* \* \* \*